United States Patent Office 3,531,544
Patented Sept. 29, 1970

3,531,544
SELECTIVE DEHYDROGENATION OF LONG-CHAIN NORMAL PARAFFIN HYDROCARBONS
Roy C. Berg, Park Ridge, Ill., assignor to Universal Oil Products Company, Des Plaines, Ill., a corporation of Delaware
No Drawing. Filed Apr. 22, 1968, Ser. No. 723,264
Int. Cl. C07c 5/18
U.S. Cl. 260—683.3                                           8 Claims

ABSTRACT OF THE DISCLOSURE

An inprovement in a process for the selective dehydrogenation of long-chain normal paraffin hydrocarbons to form a product stream containing normal mono-olefins, unreacted normal paraffins, and aromatic contaminants; separation of the normal mono-olefins from the resultant product stream to produce a mixture of unreacted normal paraffin hydrocarbons and the aromatic contaminants; and recycling of this mixture back to the dehydrogenation step. The build-up of the aromatic contaminants in this normal paraffin recycle stream results in deterioration of the activity and selectivity of the catalyst used in the dehydrogenation step. Solution embodied herein comprehends acid treating at least a portion of the normal paraffin-containing recycle stream, prior to its being recycled to the dehydrogenation step to produce a substantially aromatic contaminant-free hydrocarbon stream and passing the resultant treated stream to the dehydrogenation step. Control of aromatics contaminant to 1.1% resulted in deactivation rate of 0.09 degrees F. per barrel per pound of cat. (BPP) at 105 BBP compared to 1.6 degrees F. BBP for 3.0% uncontrolled contaminant.

---

The subject of the present invention is an improvement in a process for the selective dehydrogenation of normal paraffin hydrocarbons having at least 6 carbon atoms wherein a hydrocarbon feed stream is catalytically dehydrogenated to form a product stream containing unreacted normal paraffins which are subsequently recovered and recycled to the dehydrogenation step. More precisely, the present invention relates to an improvement in one of the commercially feasible routes to long-chain normal mono-olefins which route uses normal paraffins in conjunction with a selective catalytic dehydrogenation operation operated with a closed-loop recycle of unreacted normal paraffins.

The concept of the present invention originated with my recognition of the detrimental effect caused by the presence of aromatic hydrocarbons in the charge to this catalytic dehydrogenation process. Coupled with this recognition was my observation that even where substantially pure normal paraffins are charged to the dehydrogenation process, economic and equilibrium factors dictate that unreacted normal paraffins be recycled to extinction; and when this occurs a concentration of aromatic hydrocarbons is typically observed to build in this recycle stream because of dehydrocyclization side reactions which appear to be an inevitable concurrent reaction taking place in the dehydrogenation zone. More to the point, the concept of the present invention involves recognition that catalysts suitable for dehydrogenation of long-chain normal paraffins are sensitive to the presence of cyclic contaminants which can enter the process in the feed stream or can be synthesized within the process and which typically build-up to detrimental concentrations because of the commercial necessity to operate with recycle of unreacted normal paraffins. Accordingly, the present invention provides a means for holding the concentration of aromatic contaminants in the normal paraffin recycle stream to levels which result in the improvement of the performance of the catalyst utilized in the dehydrogenation step relative to the catalyst performance that is achieved when these aromatic contaminants are allowed to accumulate in this recycle stream in an uncontrolled fashion.

Although extensive work has been done in the general area of production of mono-olefins from paraffins, the chief effort in the past has been primarily concentrated on lower molecular weight paraffins (i.e. paraffins having 2 to 6 carbon atoms). This concentration of effort was basically caused by the ready availability of large quantities of these paraffins and, probably, by the building-block nature of the product olefins—for example, ethylene. Recently, attention within the chemical and petroleum industry has been focused upon the problem of acquiring longer chain mono-olefins. In particular, a substantial demand has been established for normal mono-olefins having 6 to 20 carbon atoms. As might be expected, this demand is primarily a consequence of the growing commercial importance of the products that can be synthesized from these normal mono-olefins. For example, derivatives of normal mono-olefins have become of substantial importance to the detergent industry because these normal mono-olefins can be used to alkylate an alkylatable aromatic, such as benzene, and the resulting arylalkane can be transformed into a wide variety of biodegradable detergents such as the alkylaryl sulfonate (anionic) type of detergent which is most widely used for household, commercial and industrial purposes. Another type of detergent produced from this arylalkane is alkylaryl polyoxyalkylated amine. Still another large call of detergents produced from these normal mono-olefins are the oxyalkylated phenol derivatives in which the alkylphenol base is prepared by alkylation of phenol.

Other uses of the long-chain mono-olefins include: direct sulfation to form biodegradable alkylsulfates of the type R—$OSO_3Na$; direct sulfonation with sodium bisulfate to yield biodegradable detergents of the type $RSO_3Na$; hydration to alcohols which are used to produce plasticizers or synthetic lube oils; hydration to alcohols followed by dehydrogenation to form ketones which can be used in the manufacture of secondary amines by reductive alkylation; ester formation by direct reaction with acids in the presence of a catalyst such as $BF_3$ etherate; and in the preparation of a di-long chain alkylbenzene, of which the heavy metal sulfonate salts are prime lube oil detergents.

Responsive to this demand for these normal mono-olefins, the art has developed a number of alternative methods to produce them in commercial quantities. One method that has attracted a great deal of attention, involves the selective dehydrogenation of a normal paraffin containing stream by contacting it and hydrogen with a non-acid, alumina-supported, platinum metal-containing catalyst. The principal feature that distinguishes this method from previous attempts at the solution of the problem of direct dehydrogenation of long-chain normal paraffins, involves the capability of this catalyst to sustain a high level of selectivity for the production of the desired normal mono-olefins with the complementary capability to suppress undesired side reactions such as skeletal isomerization, secondary dehydrogenation, dehydrocyclization polymerization, cracking, etc. The term "selectivity" is used herein to measure the weight percent of the conversion products from the dehydrogenation reaction that are the desired normal mono-olefins; for example, if 10 weight percent of a feed stream is converted in one pass through the dehydrogenation step and about 8 weight percent of the feed stream is converted to normal mono-olefins, the selectivity for normal mono-olefins is 80%. Likewise, for a process operated to obtain 100% conversion of the input stream, the selectivity for normal mono-olefins equals the weight percent of the input stream that is recovered as normal mono-olefins.

In order to further enhance the selectivity feature of this dehydrogenation method, it is ordinarily conducted at severity levels resulting in a weight percent conversion per pass through the dehydrogenation zone in the range of about 5 to 20 weight percent. This last requirement is in harmony with the well-known degradation in selectivity levels as a direct function of conversion levels: that is, high conversion requires high severity levels which in turn degrade selectivity. Hence, this dehydrogenation method must be operated at a low conversion per pass, and because of this the economics of the resultant process dictate that the unreacted normal paraffins present in the output stream from the dehydrogenation step be recovered and recycled to extinction. Accordingly, a preferred process for the preparation of normal mono-olefins from normal paraffin involves the steps of: (1) selective dehydrogenation using a catalyst containing a platinum group component, an alkali component, and an alumina component; (2) separation of products, and (3) recycle of unreacted normal paraffins.

It is to be emphasized at this point that the acquisition and retention of this high selectivity feature of this catalyst is a critical condition for its stable operation. This is true because the unreacted normal paraffins that are recycled are ordinarily recovered in a recovery system which does not have the capability to distinguish between types of hydrocarbons in a given boiling range—for example, a typical recovery system which separates the normal paraffin using distillation means wherein the unreacted normal paraffins would be separated from a derivative of the normal mono-olefins boiling outside the range of the unreacted normal paraffins. Accordingly, any side products that are synthesized in the dehydrogenation plus any contaminants present in the feed stream can accumulate in this recycle paraffin stream, if they boil within the boiling range of the unreacted normal paraffins. This contamination of the recycle paraffin stream leads to several significant adverse effects: (1) these contaminants are somewhat refractory to the conditions utilized in the dehydrogenation step and consequently in order to maintain a constant weight percent conversion of this stream to normal mono-olefins, it is necessary to raise the severity level utilized in the dehydrogenation step, and (2) the presence of these contaminants greatly increase the rate of formation of deleterious carbonaceous deposits on the catalyst. Both of these effects eventually result in degradation of the high selectivity feature of this catalyst.

I have now found that the principal contaminants causing this catalyst degradation problem are aromatic contaminants and that this preferred dehydrogenation process can be significantly improved by treating at least a portion of this unreacted normal paraffin recycle stream to remove aromatic contaminants therefrom, and thus prevent the build-up of these contaminants in this stream. Furthermore, I have found that a convenient and simple procedure for performing this aromatic contaminant removal function involves combining an acid treating step with this preferred dehydrogeneration process.

It is, accordingly, an object of the present invention to provide an improved process for the selective catalytic dehydrogenation of a hydrocarbon stream containing normal paraffin hydrocarbons wherein unreacted normal paraffin hydrocarbons are recovered and recycled to extinction. A second object relates to a selective catalytic dehydrogenation process which uses a non-acid, alumina-supported, platinum metal-containing catalyst to dehydrogenate a hydrocarbon stream containing normal paraffinic hydrocarbons in which process unreacted normal paraffins are recovered and recycled to extinction, the object being to improve the stability of the over-all process. Another object relates to a dehydrogenation process operated with unreacted normal paraffin recycle, the object being to provide a means for removal of aromatic contaminants from such recycle stream without simultaneously producing any substantial amount of non-normal components. Yet another object is to control the principal cause of deactivation for a preferred catalytic dehydrogenation process designed to produce normal mono-olefin from normal paraffins.

In one embodiment, the present invention comprehends a process for the selective dehydrogenation of normal paraffin hydrocarbons having at least 6 carbon atoms. In this process, a hydrocarbon feed stream containing normal paraffin hydrocarbons is catalytically dehydrogenated to form a product stream containing normal mono-olefins having the same number of carbon atoms as the normal paraffin hydrocarbons, unreacted normal paraffin hydrocarbons, and aromatic contaminants boiling within the range of the normal paraffin hydrocarbons. Thereafter, the normal mono-olefins are removed from this product stream to produce a mixture of unreacted normal paraffin hydrocarbons and the aromatic contaminants. And this mixture is recycled to the dehydrogenation step where the aromatic contaminants contained therein adversely affect the performance of the catalyst employed in the dehydrogenation step. In this process, the improvement of the present invention comprises acid treating at least a portion of the mixture, prior to its being recycled to the dehydrogenation step, to produce a substantially aromatic contaminant-free hydrocarbons stream and passing the resulting treated stream to the dehydrogenation step, thereby improving the performance of the catalyst employed therein.

In a second embodiment, the present invention encompasses a process of the type described above wherein the dehydrogenation catalyst employed in the dehydrogenation step comprises a platinum group component and an alkali component composited with an alumina carrier material.

In another embodiment, the present invention relates to a process as described in the first embodiment above wherein the acid treating step comprises: contacting a portion of said mixture with sulfuric acid at conditions sufficient to react aromatic contaminants with sulfuric acid; contacting the resulting and treated stream with an alkaline solution at conditions effecting the neutralization thereof; and recovering a substantially aromatic contaminant-free hydrocarbons stream from contact with the alkaline solution.

Other embodiments and objects of the present invention encompass further details about: hydrocarbon stream that are charged thereto, the types of catalysts used in the dehydrogenation step thereof, the process conditions used in the various steps thereof, the mechanics of the conversion, separation, and product recovery steps employed therein, etc. These embodiments and objects will become evident from the following detailed discussion of each of these facets of the present invention.

The hydrocarbon feed stream that can be charged to the process of the present invention contains normal paraffin hydrocarbons having at least 6 carbon atoms and especially normal paraffin hydrocarbons having about 9 to about 20 carbon atoms. Representative members of this class are: hexane, heptane, nonane, decane, undecane, dodecane, tridecane, tetradecane, pentadecane, hexadecane, heptadecane, octodecane, eicosane, etc. and mixtures thereof. Hydrocarbon feed streams containing normal paraffins of about 10 to 15 carbon atoms are particularly advantageously used since these produce normal mono-olefins which can be used to make sulfonated aryl-alkane-type detergents having superior biodegradability and detergency. For example, a mixture containing a 4 or 5 homologue spread such as a $C_{10}$ to $C_{13}$ mixture, a $C_{11}$ to $C_{14}$ mixture, or a $C_{11}$ to $C_{15}$ mixture, provides an excellent charge stock. It is preferred, moreover, that the amount of non-normal hydrocarbons present in this hydrocarbon feed stream be kept at low levels. Thus, it is preferred that the feed stream contain greater than 90 weight percent of normal paraffin hydrocarbons with best results achieved with purities in the range of 96 to 98 weight percent or more. In accordance with the present invention, it is preferred that the amount of aromatic contaminants present in the feed stream be held to substantially negligible levels—that is, less than about 1 weight percent and, more preferably, less than 0.5 weight percent of the feed stream. Typically, these aromatic contaminants are alkyl aromatics, alkyl indanes, and bicyclic aromatics. Accordingly, it is within the scope of the present invention to pretreat the hydrocarbon feed streams to remove substantially all of the aromatic contaminants present therein. In fact, in one embodiment the present invention embraces a process in which the hydrocarbon feed stream is charged to the acid treating step that is also utilized to treat a side stream from the normal paraffin recycle stream around the dehydrogenation step, and the entire product stream from the acid treating step is passed to the dehydrogenation step.

In a preferred embodiment, the hydrocarbon feed stream is obtained by subjecting a hydrocarbon distillate containing normal paraffin hydrocarbons and non-normal hydrocarbons such as naphthenes, aromatics, and isoparaffins to a separation operation employing one or more beds of molecular sieves having a pore size of about 5 Angstrom units. These sieves have the well-known capability to remove normal paraffin hydrocarbons from such a hydrocarbon distillate by allowing the normal paraffins to enter into the interconnecting network contained in their crystal structure. This separation operation is based on the fact that normal paraffin hydrocarbons have a critical diameter of about 4.9 Angstrom units, and thus, these molecules are allowed to enter into the pore structure of the molecular sieves having a diameter of about 5 Angstrom units with the substantial exclusion of non-normal hydrocarbons because they have critical diameters greater than 5 Angstrom units. The driving force for the entrance of the normal paraffins hydrocarbons into the molecular sieves is believed to be the concentration gradient of these normal paraffin hydrocarbons existing along the axis of the pore structure. The normal paraffin hydrocarbons are thereafter recovered from the sieves typically by displacement with a lower molecular weight normal paraffin hydrocarbon to produce an extract stream containing normal paraffins and a minor amount of the displacing fluid. The extract stream is then typically subjected to a suitable fractionation operation designed to separate the displacing fluid therefrom and in some cases to adjust the boiling point range of the normal paraffin-containing stream. A preferred separation system for continuously producing the normal paraffin-containing feed stream which is utilized in the present invention is described in the teachings of U.S. Pat. No. 3,310,486, and reference may be had thereto for additional details.

As was indicated hereinbefore, the catalyst used in the dehydrogenation step of the present invention is specifically designed to effectuate dehydrogenation of normal paraffin hydrocarbons while suppressing side reactions. Specifically, the preferred catalyst comprises a platinum group component and an alkali component composited with an alumina carrier material. Although it is not essential, it is generally preferred that this catalyst also contain a component selected from the group consisting of arsenic, bismuth, antimony, sulfur, selenium, tellurium, and compounds thereof.

The alumina carrier material of this dehydrogenation catalyst generally has an apparent bulk density of less than about 0.50 gm./cc. with a lower limit of about 0.15 gm./cc. The surface area characteristics of this alumina are preferably such that the average pore diameter is about 20 to about 3000 Angstroms; the pore volume is about 0.10 to about 1.0 ml./gm.; and the surface area is about 100 to about 70 m.²/gm. Particularly preferred alumina carriers comprise gamma-alumina. The alumina carrier material may be manufactured by any suitable method including the well-known alumina sphere manufacturing procedure detailed in U.S. Pat. No. 2,620,314.

The alkali component is selected from both the alkali metals—cesium, rubidium, potassium, sodium—and the alkaline earth metals—calcium, magnesium, and strontium, with best results obtained with lithium. Preferably the catalyst contains this component in the amount of about 0.01 to about 1.5 wt. percent. Additionally, this component is preferably combined with the alumina by impregnation.

The platinum group component is generally selected from the group of palladium, iridium, ruthenium, rhodium, osmium, and platinum, with platinum giving best results. The platinum group component may be used in a form of the elemental metal or as a suitable compound such as the oxide, sulfide, halide etc., although it is generally preferred that it be used in a concentration calculated on an elemental basis of about 0.05 weight percent to about 5.0 weight percent of the catalytic composite with best results obtained at a level of about 0.5 to about 1.5 weight percent. This component may be composited in any suitable manner with impregnation by water soluble compounds such as chloroplatinic acid being especially preferred.

Preferably, the dehydrogenation catalyst contains a fourth component selected from the group consisting of arsenic, antimony, bismuth, sulfur, selenium, tellurium, and compounds thereof. Arsenic is particularly preferred. This component is typically used with good results in an amount of about 0.01% to about 1.0% by weight of the final composite. Moreover, this component is preferably present in an atomic ratio to the platinum metal component of about 0.1 to about 0.8 with intermediate concentrations of about 0.2 to about 0.5 being highly effective. This component can be composited in any suitable manner—a particularly preferred way being using an impregnation solution of a water-soluble compound such as arsenic pentoxide, etc.

This preferred catalytic composite is thereafter typically subjected to conventional drying, oxidation, reduction treatments. In some cases, a conventional presulfiding treatment may also be given to this preferred catalyst. Additional details as to typical dehydrogenation catalyst suitable for use in the present invention are given in the teachings of U.S. Pats. Nos. 3,291,755 and 3,310,599.

In the dehydrogenation step of the present invention, the hydrocarbon feed stream containing normal paraffins is admixed with hydrogen, heated to conversion temperature by conventional heating means, and charged to a dehydrogenation zone containing the above described catalyst. Although the dehydrogenation catalyst may be utilized in any suitable fashion such as fluidized system, a moving bed-type system, a slurry-type system, it is generally preferred to use a fixed bed of the catalyst comprising particles having a maximum dimension of about 1/16 inch in diameter. The use of a fixed bed type system minimizes attrition losses of the valuable catalyst and facilitates control of the process operation parameters. It is, of course, understood that the dehydrogenation zone may comprise one or more reaction containing catalyst with suitable retreating means there between to compensate for the endothermic nature of the reaction.

The hydrogen used in this dehydrogenation step may be once-through hydrogen or recycle hydrogen obtained from the effluent withdrawn from the dehydrogenation step. In any event, the hydrogen is used in any amount such that the ratio of moles of hydrogen to moles of hydrocarbon introduced in the hydrocarbon feed stream is about 1:1 to about 20:1, with about 5:1 to about 15:1 moles of hydrogen per mole of hydrocarbon giving good results. In some cases, a relatively inert diluent such as water, methane, etc. may also be charged to the first dehydrogenation step in order to facilitate control of the partial pressure of the various reactants utilized therein, or to furnish a source for at least a portion of the heat of reaction, or any other conventional purpose known to those skilled in the art. In face, a preferred embodiment of the present invention comprises using a small amount of water, about 1000 to about 5000 wt. p.p.m. equivalent $H_2O$, in the hydrocarbon feed stream to maintain the activity of the catalyst at a high level.

This dehydrogenation step is conducted at a temperature of about 750° F. to about 1100° F. with a preferred range being about 800° F. to about 950° F. In addition, a pressure of about 10 p.s.i.g. to about 100 p.s.i.g. is utilized in the dehydrogenation zone and is measured at the outlet from the dehydrogenation zone. Also, a liquid hourly space velocity (LHSV) of about 10 to about 40 hr.$^{-1}$ is preferably used, where LHSV is defined to be the equivalent liquid volume of the total hydrocarbon stream (including both fresh feed and recycle) entering the dehydrogenation zone per hour divided by the total volume of the dehydrogenation zone containing catalyst. As is evident to those skilled in the art, the exact selection of conditions within these broad ranges is a pronounced function of the boiling point range of the hydrocarbon feed stream: the higher boiling feed streams requiring a severity level of much less intensity than for the lower boiling feed streams. In view of the necessity of recycling unreacted normal paraffins to the dehydrogenation zone, the preferred procedure is to operate the process such that a constant weight percent conversion is obtained in the dehydrogenation zone with the operating parameters, principally conversion temperature, being continuously adjusted in order to achieve this constant conversion objective. Operating in this manner facilitates the control of the process in that the input streams and output streams for this process can be charged and withdrawn at relatively constant rates thereby eliminating transients from the system.

An effluent stream is then withdrawn from the dehydrogenation step, cooled by conventional cooling means to a temperature of about 100° F. and passed to a conventional separating zone wherein a hydrogen-rich vaporous phase separates from a hydrocarbon-rich liquid phase. The hydrogen-rich vapor phase will typically be greater than 90 mole percent hydrogen with a minor amount of $C_1$ through $C_3$ light ends contained therein. This hydrogen-rich vapor is withdrawn from the separating zone, and portion of this withdrawn stream is then typically passed through a conventional compressing means and recycled to the dehydrogenation step in order to furnish the preferred amount of the hydrogen used therein. Another portion of this withdrawn stream is vented from the system in order to maintain pressure control.

The liquid phase that forms in the separation zone is withdrawn and forms a product stream, from the dehydrogenation step, containing unreacted normal paraffins corresponding in boiling point range to the paraffins present in the feed stream, normal mono-olefins which also correspond in carbon number to the normal paraffins present in the hydrocarbon feed stream and a minor amount of aromatic contaminants which give rise to the problem of concern to the present invention. The source of these aromatic contaminants may be either the minor amount of these materials that are present in the hydrocarbon feed stream to the dehydrogenation step and/or they may result from a minor amount of dehydrocyclization that inevitably occurs as a side reaction in the dehydrogenation step. Regardless of exactly how these aromatic contaminants get in this product stream from the dehydrogenation step, the present invention is directed at a process of this type herein characterized where these aromatic contaminants are present. As indicated previously, these aromatic contaminants are primarily alkyl aromatic, alkyl indanes, and bicyclic aromatics; and, in addition, as has been heretofore pointed out they are quite refractory to the conditions utilized in the dehydrogenation step and will accumulate in this product stream.

This withdrawn product stream is then passed to a separation step designed to remove the normal mono-olefins therefrom. In general, any suitable method may be used to separate the normal mono-olefins from this liquid phase including physical techniques such as selective adsorption, selective absorption, extractive distillation, etc. or chemical techniques which depend on the relatively high reactivity of the mono-olefins as contrasted with the relatively inert characteristics of the unreacted normal paraffins and the contaminating aromatics. For example, one physical method of separation involves passing the mixture through a bed of suitable adsorbent which selectively retains the normal mono-olefins. Typical adsorbents of this type include activated silica gel in particle form, activated charcoal, activated alumina, suitable molecular sieves, etc. A normal mono-olefin-free stream is then withdrawn from contact with the adsorbent material.

A preferred chemical method for removing the normal mono-olefins from this mixture involves an alkylation step wherein the mixtures are commingled with a suitable alkylatable aromatic, benzene being preferred, and charged to an alkylation zone containing a suitable acid-acting alkylation catalyst such as a substantially anhydrous solution of hydrogen fluoride. The normal mono-olefins react with the alkylatable aromatic while the normal paraffins and aromatic contaminants remain substantially unchanged. The unreacted normal paraffins can then be easily recovered from the effluent from the alkylation zone by a suitable fractionation system. For additional details as to suitable catalysts, conditions, and mechanics of this alkylation step, reference may be had to the teachings of U.S. Pat. Nos. 3,312,734, 3,249,650 and 3,200,163.

Regardless of the mechanics of the separation step by which the normal mono-olefins are removed from the effluent stream produced by the dehydrogenation step, a stream containing unreacted normal paraffins and aromatic contaminants is recovered from this separation step and, as mentioned above, the economics of the resultant process requires that this stream be recycled to the dehydrogenation step. Accordingly, it is an essential feature of the present invention that at least a portion of this recycle stream is acid treated to remove the aromatic contaminant therefrom prior to its being passed back to the dehydrogenation step. It is to be emphasized that it is not necessary to treat the entire recycle stream to achieve the substantially improved catalyst performance, although in some cases, it may be advantageous to acid treat the entire recycle stream. In general, I have found that these aromatic contaminants can cause serious problems in the dehydrogenation step if their concentration by weight exceeds about 5% of the recycle normal paraffin-containing stream. Accordingly, the amount of the side stream which is acid treated is preferably selected to hold the aromatic concentration in this recycle stream to a value less than 5 weight percent of the unreacted normal paraffin recycle stream and, best results are obtained when the weight percent of the aromatic contaminants is held to a value less than about 2 weight percent. The amount of the side stream that is acid treated is dependent upon the rate at which the aromatic contaminants are entering the system and the rate at which they are being synthesized in the dehydrogenation zone, and these rates in turn are a function of the composition of the charge stock, the exact nature of the catalytic composite utilized in the dehydrogenation step, the severity level employed in the dehydrogenation step, accumulated life of the catalyst, and other factors well-known to those skilled in the art. Hence, the amount of the recycle stream that is acid treated in order to hold the aromatic contaminant concentration to the desired level is a function of many factors that must be determined in each individual case by analytic techniques and/or experimental techniques familiar to those skilled in the art; however, I have determined that good results are obtained when about 0.2 weight percent to about 20 weight percent of this recycle normal paraffin stream is acid treated in accordance with the present invention. And in a preferred embodiment where the hydrocarbon feed stream is substantially free of aromatic contaminants, I have found excellent results when the side stream constitutes about 0.2 weight percent to about 5 weight percent of the normal paraffin recycle stream.

In accordance with the present invention, the side stream withdrawn from this normal paraffin recycle stream is subjected to an acid treatment step designed to remove aromatic contaminants therefrom. Any suitable acid known to the art to selectively react with aromatic compounds while not affecting normal paraffin hydrocarbons may be used in the process of the present invention. In general, the preferred acid for use in the present invention is highly concentrated sulfuric acid of about 93 weight percent to 100 weight percent or higher— the higher than 100% $H_2SO_4$ solutions commonly being used to designate so-called "fuming" sulfuric acid or oleum which contains dissolved $SO_3$. In fact, for purposes of the present invention, I find best results are obtained when using fuming sulfuric acid containing about 1 to about 20 weight percent free $SO_3$, particularly where the aromatic contaminants are principally lower alkyl aromatics. In some cases, spent alkylation acid or about 90 to 93 weight percent sulfuric acid can be used if a subsequent re-running operation or the treated output stream is used, in conjunction therewith to eliminate higher boiling sludge materials from the effluent of the acid treating step. While sulfuric acid is preferred in the acid treating step of the present invention, it is understood that other suitable acids may be employed including phosphoric acid, hydrofluoric acid, boron trifluoride solutions, etc. It is also understood that these different acids are not necessarily equivalent in their effectiveness for removing aromatics and may require some adjustment of other parameters of the treating step such as the volume of the recycle solution that is treated in the acid treating step, etc. In general, the conditions utilized in the acid treating step are adjusted to achieve substantially complete removal of the aromatic contaminants contained in the side stream charged to this step. Thus, it is preferred to operate at a temperature of about 70 to about 150° F. with a preferred value of about 90 to 110° F. In addition, the pressure is ordinarily selected to maintain the reactants for the acid treating step in the liquid phase with atmospheric pressure generally found to be satisfactory. The quantity of acid utilized per barrel of the side stream that is acid treated is generally selected from a range of about 10 pounds of acid per barrel of treated stock to about 200 pounds of acid per barrel of treated stock with a value in the range of 50 to 100 pounds of acid per barrel being generally preferred—this last number refers to pounds of fuming sulfuric acid and would have to be suitably adjusted if another acid is utilized. Obviously, the time required for the reaction between the acid and the aromatics is a pronounced function of the fineness of the dispersion of the acid throughout the oil and the time required to separate the acid sludge (i.e. the reaction products) from the oil phase. In general, good results are obtained at a contact time of about 10 to about 50 minutes for fuming sulfuric acid.

Following the acid treating step, a substantially aromatic contaminant-free hydrocarbon stream is withdrawn from contact with the acid. In general, the acid treated stream may contain some acid carry-over and, accordingly, it is preferably given a wash with an alkaline solution—particularly, sodium hydroxide, potassium hydroxide solution, etc. In another embodiment, this acid treated stream may be first washed with a water solution and then treated with a suitable alkaline solution for the purpose of removing any acid carry-over. It is particularly important that no acidic material be allowed to reach the dehydrogenation step since the catalyst utilized therein is deliberately maintained nonacidic in order to suppress acid-catalyzed reactions, such as skeletal isomerization, which are particularly detrimental to the product structure of the present process. In a preferred embodiment, a sodium hydroxide solution is utilized to neutralize the acid treated stream withdrawn from the acid treating step; and preferably an alkaline aqueous solution containing about 3 to 5 weight percent sodium hydroxide is used, although aqueous solutions having higher concentrations may also be used. In general, the conditions utilized in the neutralization step of the present invention are selected to insure that the acid-acting materials are substantially removed from the treated distillate.

After the neutralization step of the present invention a treated hydrocarbon stream is withdrawn from contact with the alkaline solution and is passed to the dehydrogenation step. In some cases, it may be advantageous to rerun this treated stream in a fractionation means in order to remove higher boiling material formed in the acid treating step.

The following example is introduced to illustrate further the novelty, mode of operation and usage of the present invention. It illustrates a preferred embodiment of the present invention; and it is not intended to limit unduly the present invention thereby since it is intended to be illustrative rather than restrictive.

EXAMPLE

This example illustrates the principal benefits of using the present invention by contrasting the results obtained with and without it for substantially the same charge stock, dehydrogenation catalyst and mono-olefin recovery step. Case A is the control case and Case B embodies the present invention.

In both cases, the dehydrogenotion process is performed in a laboratory scale plant comprising: (1) a dehydrogenation section containing a reactor, a hydrogen separator, a fractionation means, along with suitable pumps, heaters, compressors, etc.; (2) a mono-olefin recovery section containing an alkylation reactor, and acid separating zone, and suitable pumps, cooling means, etc.; (3) and a product separation system consisting of a number of conventional fractionation columns designed to separate the products of the alkylation step. The flow scheme utilized in this plant for Case A is essentially as follows: (1) a hydrocarbon feed stream is admixed with hydrogen and about 2000 weight p.p.m. of water, heated, and charged to the dehydrogenation reactor which contains a fixed bed of the preferred dehydrogenation catalyst; (2) and effluent stream is withdrawn from the dehydrogenation reactor, cooled to about 100° F., and passed to the hydrogen separator where a phase separation occurs; (3) a hydrogen-rich gas stream is withdrawn from this separator and divided into two streams, one of which is vented to maintain pressure control, and the other of which is passed through suitable compressing means back to the dehydrogenation step; (4) a liquid phase is withdrawn from the hydrogen separator and charged to a fractionating means wherein water and light ends (i.e. less than lower boiling point of the feed stream) are taken overhead with a dried product stream being recovered as bottoms; (5) this bottoms stream is then combined with a dry benzene stream and the resulting mixture charged to the alkylation reactor wherein the combined stream is contacted with a hydrogen fluoride stream; (6) an effluent stream is then withdrawn from the alkylation reactor and passed to the acid separating zone wherein an acid phase separates from a hydrocarbon phase; (7) the acid phase is withdrawn and recycled to the alkylation reactor and the hydrocarbon phase is withdrawn, and charged to the first fractionation column of the product recovery system wherein unreacted benzene is taken overhead and recycled to the alkylation reactor, the bottom stream from the first fractionation is then treated with alumina to remove alkylfluoride and passed to a second fractionation column where unreacted normal paraffins and aromatic contaminants boiling within the range of the normal paraffins are taken overhead, the bottoms from this second fractionator are then further fractionated to recover the phenylalkane product of the alkylation reaction; (8) the overhead stream from the second fractionator is recycled to the dehydrogenation step where it is commingled with the hydrocarbon feed stream.

The flow scheme for Case B is essentially the same as Case A except that a side stream comprising about 2.2 weight percent of the normal paraffin recycle stream is separated therefrom and passed to an acid-treating section of the plant. This acid treating section consists of three stream mixing means and three separating zones. The flow scheme in this section involves: (1) contacting, in the first mixing means the side stream with a fuming sulfuric acid stream, and passing the resulting mixture into the first separating zone where an acid phase separates from a hydrocarbon phase; (2) the hydrocarbon phase is withdrawn and contacted with a water stream in the second mixing means and the resulting mixture is passed into the second separating zone where a hydrocarbon phase separates from a water phase; (3) the hydrocarbon phase from the second separating zone is withdrawn from this zone, contacted with a sodium hydroxide solution in the final mixing means, and the resulting mixture passed to the third separating zone wherein an alkaline separates from a treated hydrocarbon phase; (4) the treated hydrocarbon phase is then withdrawn and passed to the dehydrogenation step where it is also commingled with the hydrocarbon feed stream.

The charge stock used in both cases is described in Table I.

TABLE I.—PROPERTIES OF CHARGE STOCK

| | |
|---|---|
| API gravity | 55.8 |
| Initial boiling point, ° F. | 354 |
| 10% boiling point, ° F. | 400 |
| 50% boiling point, ° F. | 413 |
| 90% boiling point, ° F. | 444 |
| End boiling point, ° F. | 459 |
| Sulfur, wt. p.p.m. | 0.2 |
| Nitrogen, wt. p.p.m. | 0.1 |
| Chloride, wt. p.p.m. | 1 |
| Bromine index | 2 |
| n-$C_{10}$, wt. percent | 0.3 |
| n-$C_{11}$, wt. percent | 26.4 |
| n-$C_{12}$, wt. percent | 31.2 |
| n-$C_{13}$, wt. percent | 25.3 |
| n-$C_{14}$, wt. percent | 13.3 |
| n-$C_{15}$, wt. percent | 0.4 |
| Aromatics, wt. percent | 0.21 |
| Monocyclic paraffins | 1.46 |
| Dicyclic paraffins | .68 |
| Iso-paraffins | .75 |

The catalyst used in the dehydrogenation reactor for both cases is prepared according to the method given in U.S. Pat. No. 3,291,755. Analysis of the catalyst shows it to contain, on an elemental basis, 0.76 wt. percent Pt, 0.041 wt. percent As, 0.55 wt. percent Li,—All composited with a gamma alumina carrier material. Furthermore, it has an ABD of 0.46 gm./cc., a surface area of 145 m.²/gm. and a pore volume of 0.40 ml./gm. This catalyst was used in the dehydrogenation zone as a fixed bed of 1/16 inch spheres.

The catalyst used in the alkylation is a solution of 95 weight percent hydrogen fluoride.

In both cases, the dehydrogenation step is operated at: a LHSV based on combined feed to 28.0 hr. −1, a pressure at the outlet of the reactor of 20 p.s.i.g., a hydrogen to hydrocarbon mole ratio of 9:1 and a temperature selected from the range of about 850° F. to about 925° F. in order to continuously maintain a 10 weight percent conversion based on disappearance of the normal paraffins from the feed.

Similarly, in both cases the alkylation step is run at: a mole ratio of benzene to total olefin in the influent thereto of about 12:1, a volume ratio of hydrogen fluoride to total hydrocarbon charged thereto of 2:1, a temperature of about 80° F. to 140° F. and a residence time of about 20 minutes.

For Case B, the acid treating step is operated with: fuming sulfuric acid containing 15% free $SO_3$, at a rate of acid addition corresponding to about 73 pounds of acid per barrel of the side stream charged thereto, at a temperature of about 100° F., a pressure of about 85 p.s.i.g., and a contact time of about 15 minutes. Likewise, the water wash step and caustic wash step are operated at conditions sufficient to neutralize the resulting treated stock.

Both cases are run for a test period corresponding to a catalyst life of about 50 barrels of total charge per pound of catalyst contained in the dehydrogenation step (BPP) with the results shown in Table II.

TABLE II—COMPARATIVE RESULTS

| | Case A | Case B |
|---|---|---|
| Wt. percent aromatics in recycle paraffin stream at 55 BPP | 1.0 | 1.0 |
| Wt. percent aromatics in recycle paraffin stream at 105 BPP | 3.0 | 1.1 |
| Average rate of increase of aromatics in recycle stream, wt. percent/BPP | 0.040 | 0.002 |
| Deactivation rate, ° F./BPP | 1.6 | 0.092 |

As can be seen from the table, operating in accordance with the present invention essentially stopped the build-up of aromatic contaminants in this recycle stream at a level of about 1 weight percent. Furthermore, the average deactivation rate of the catalyst decreased by about 42.5% indicating the sharp increase in stability of the dehydrogenation catalyst which is enabled by the present invention.

I claim as my invention:

1. In a process for the selective dehydrogenation of normal paraffin hydrocarbons having at least 6 carbon atoms wherein:
    (a) a hydrocarbon feed stream containing the normal paraffin hydrocarbons is catalytically dehydrogenated to form a product stream containing normal monoolefins having the same number of carbon atoms as said normal paraffin hydrocarbons, unreacted normal paraffin hydrocarbons, and aromatic contaminants boiling within the range of the normal paraffin hydrocarbons;
    (b) the normal mono-olefins are removed from said product stream to produce a mixture of unreacted normal paraffin hydrocarbons and aromatic contaminants; and
    (c) said mixture is recycled to the dehydrogenation step where said aromatic contaminants contained therein adversely affect the performance of the catalyst used therein;
the improvement comprising acid treating at least a portion of said mixture, prior to its being recycled to the dehydrogenation step, to produce a substantially aromatic contaminant-free hydrocarbon stream and passing the resulting treated stream to the dehydrogenation step, thereby improving the performance of the catalyst employed therein.

2. The improved process of claim 1 wherein the catalyst employed in the dehydrogenation step comprises a platinum group component, and an alkali component composited with an alumina carrier material.

3. The improved process of claim 2 wherein the catalyst contains a component selected from the group consisting of arsenic, antimony, bismuth, sulfur, selenium, tellurium and compounds thereof.

4. The improved process of claim 1 wherein the hydrocarbon feed stream contains normal paraffin hydrocarbons having 10 to 15 carbon atoms.

5. The improved process of claim 1 wherein the hydrocarbon feed stream contains a mixture of normal paraffin hydrocarbons boiling in the $C_{11}$ to $C_{14}$ range.

6. The improved process of claim 1 wherein the acid treating step comprises contacting a portion of said mixture with sulfuric acid at conditions sufficient to react aromatic contaminants with sulfuric acid; withdrawing an acid-treated hydrocarbon stream from contact with the sulfuric acid, contacting said acid-treated stream with an alkaline solution at conditions effecting the neutralization thereof, and recovering a substantially aromatic contaminant-free hydrocarbon stream from contact with the alkaline solution.

7. The improved process of claim 6 wherein said alkaline solution is an aqueous solution of sodium hydroxide.

8. The improved process of claim 1 wherein said hydrocarbon feed stream is acid treated to remove aromatic contaminants prior to being charged to the dehydrogenation step.

References Cited
UNITED STATES PATENTS

| | | | |
|---|---|---|---|
| 3,413,373 | 11/1968 | Bloch | 260—683.3 X |
| 3,437,585 | 4/1969 | Kuchar | 260—683.3 X |

DELBERT E. GANTZ, Primary Examiner

G. E. SCHMITKONS, Assistant Examiner